United States Patent
Iwasaki et al.

(10) Patent No.: US 11,002,208 B2
(45) Date of Patent: May 11, 2021

(54) IN-VEHICLE CONTROL DEVICE

(71) Applicant: TOYOTA JIDOSHA KABUSHIKI KAISHA, Toyota (JP)

(72) Inventors: Ryota Iwasaki, Okazaki (JP); Yoshitsugu Shinohara, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/686,308

(22) Filed: Nov. 18, 2019

(65) Prior Publication Data
US 2020/0240343 A1 Jul. 30, 2020

(30) Foreign Application Priority Data

Jan. 24, 2019 (JP) .............................. JP2019-010262

(51) Int. Cl.
*F02D 41/12* (2006.01)
*F02D 41/30* (2006.01)
(Continued)

(52) U.S. Cl.
CPC ......... *F02D 41/123* (2013.01); *B60W 10/026* (2013.01); *F02D 41/3005* (2013.01);
(Continued)

(58) Field of Classification Search
CPC .................. F02D 41/123; F02D 41/126; F02D 2200/602; F02D 2200/08;
(Continued)

(56) References Cited

U.S. PATENT DOCUMENTS 4,422,353 A * 12/1983 Suga ..................... B60W 10/06
  192/3.31
5,626,535 A *  5/1997 Kono ................... B60K 31/047
  180/170
(Continued)

FOREIGN PATENT DOCUMENTS

JP  2018-090154 A  6/2018

OTHER PUBLICATIONS

U.S. Appl. No. 16/585,077, filed Sep. 27, 2019.

*Primary Examiner* — Erick R Solis
*Assistant Examiner* — Robert A Werner
(74) *Attorney, Agent, or Firm* — Oblon, McClelland, Maier & Neustadt, L.L.P.

(57) ABSTRACT

An in-vehicle control device carries out fuel cut-off for stopping fuel injection from a fuel injection valve when a prescribed fuel cut-off condition including that a lockup clutch with which a torque converter is equipped is engaged and that an accelerator is off is fulfilled. Besides, the in-vehicle control device performs a fuel cut-off suspension process for carrying out fuel injection from the fuel injection valve and releasing the lockup clutch when there is a request to suspend fuel cut-off with the accelerator off. Also, the in-vehicle control device performs a speed increase process for performing shift control of an automatic transmission such that the rotational speed of a turbine impeller with which the torque converter is equipped becomes higher while the fuel cut-off suspension process is performed than when fuel cut-off is carried out.

8 Claims, 7 Drawing Sheets

(51) Int. Cl.
*F16H 59/34* (2006.01)
*B60W 10/02* (2006.01)
*B60W 30/18* (2012.01)
*F16H 61/00* (2006.01)

(52) U.S. Cl.
CPC ....... *F16H 59/34* (2013.01); *B60W 30/18009* (2013.01); *F16H 2061/0015* (2013.01)

(58) Field of Classification Search
CPC .... F02D 2200/0802; F02D 2200/0804; B60W 10/026; B60W 10/0235; B60W 30/18009; B60W 30/18072; B60W 10/06; B60W 10/10; B60W 2030/18072; B60W 2030/18081; B60W 2540/10; B60W 2710/06; B60W 2710/025; B60W 2710/1005; F16H 59/18; F16H 59/34; F16H 2059/186
See application file for complete search history.

(56) References Cited

U.S. PATENT DOCUMENTS

| | | | |
|---|---|---|---|
| 5,928,111 A * | 7/1999 | Sakakibara | F02D 41/022 477/181 |
| 2009/0105044 A1* | 4/2009 | Kim | F16H 61/143 477/118 |
| 2013/0158838 A1* | 6/2013 | Yorke | B60W 30/18018 701/103 |
| 2014/0200113 A1* | 7/2014 | Kawamoto | B60W 10/023 477/53 |
| 2018/0156097 A1 | 6/2018 | Suzuki et al. | |
| 2019/0264802 A1* | 8/2019 | Okumura | F16H 61/686 |
| 2019/0316527 A1* | 10/2019 | Kinoshita | F02D 29/02 |

* cited by examiner

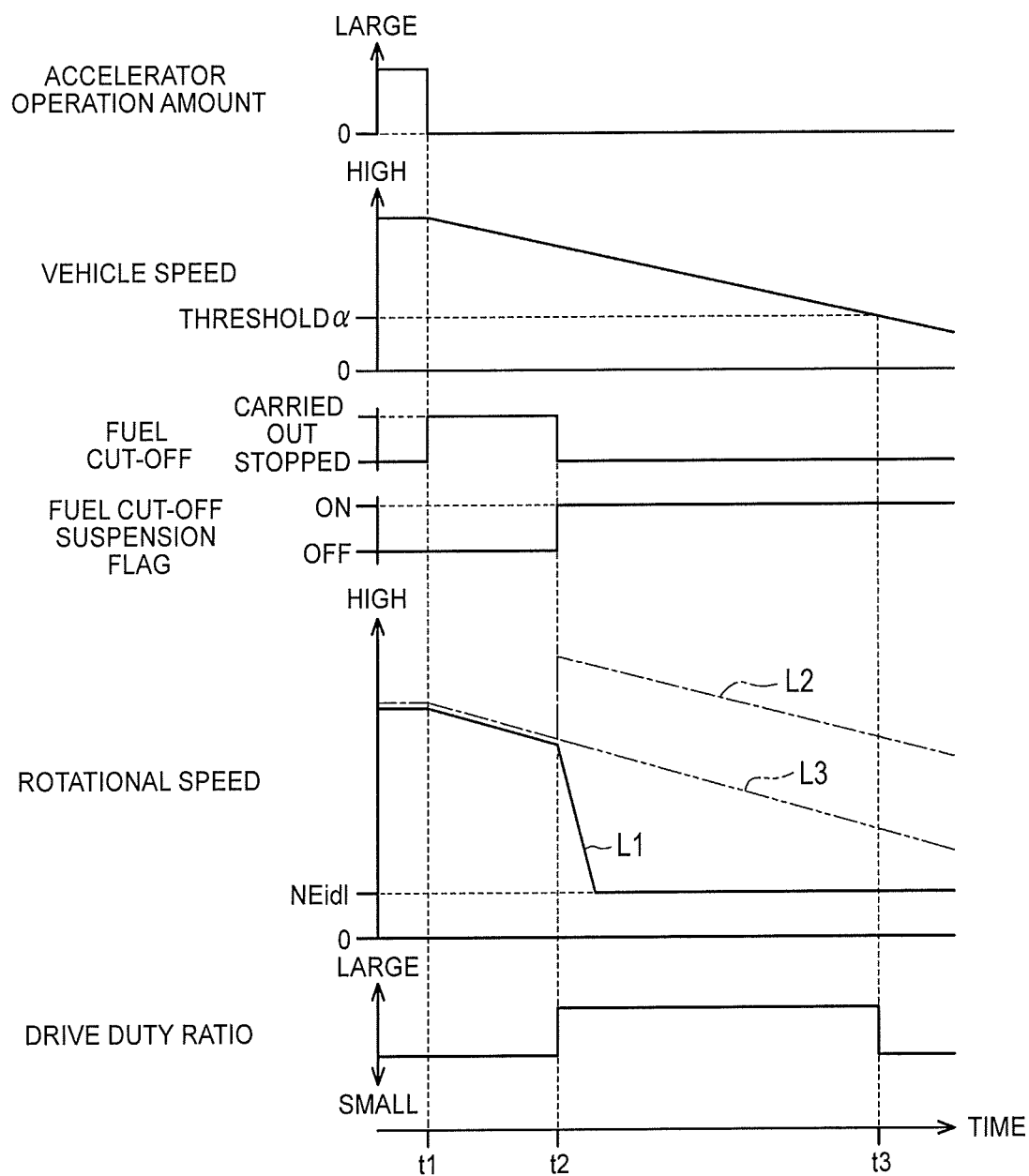

IN-VEHICLE CONTROL DEVICE

INCORPORATION BY REFERENCE

This application claims priority to Japanese Patent Application No. 2019-010262 filed on Jan. 24, 2019, the entire contents of which are incorporated herein by reference.

BACKGROUND

1. Technical Field

The disclosure relates to an in-vehicle control device.

2. Description of Related Art

Japanese Patent Application Publication No. 2018-90154 (JP 2018-90154 A) describes an internal combustion engine having an exhaust passage that is equipped with a filter that collects particulate matter (hereinafter referred to as PM) in exhaust gas. When the accelerator pedal is not pressed indicating that no engine output is required, the PM deposited in the filter is burned to regenerate the filter. This burning of the PM is performed by supplying oxygen to the filter to carry out so-called fuel cut-off for stopping fuel injection from a fuel injection valve.

SUMMARY

In the case that a vehicle that is equipped with an automatic transmission, which has a torque converter having a lockup clutch, it is preferable to perform filter regeneration via fuel cut-off when the lockup clutch is engaged. This is because when the lockup clutch is engaged, the time from a start of fuel cut-off to when the engine rotational speed falls to a rotational speed corresponding to recovery from fuel cut-off is long. Therefore, the time in which to carry out fuel cut-off is longer than when the lockup clutch is not engaged. This ensures sufficient time for filter regeneration.

When there is a request to suspend fuel cut-off with the accelerator off, and fuel injection from the fuel injection valve is resumed, it is preferable to release the engaged lockup clutch. This is because when the lockup clutch is engaged, a driving torque that is transmitted from the internal combustion engine once combustion has resumed to the driving wheels and a braking torque transmitted from the driving wheels of the vehicle are unlikely to be balanced with each other, which causes the combustion to become unstable. Due to fluctuations in output torque resulting from unstable combustion, tooth hammering noise is likely to be produced in gears of the vehicle's drive train.

If the lockup clutch is released when combustion resumes, no braking torque resulting from engine braking is transmitted to the driving wheels. Therefore, the feeling of deceleration weakens even though, because the accelerator is not depressed, vehicle decelerates.

An in-vehicle control device that solves the aforementioned problem is applied to a vehicle that equipped with an internal combustion engine, an automatic transmission, and a torque converter having an input shaft that is connected to a crankshaft of the internal combustion engine, an output shaft that is connected to the automatic transmission, and a lockup clutch that is provided between the input shaft and the output shaft. The internal combustion engine has a fuel injection valve that supplies fuel to a cylinder, and a filter that is provided in an exhaust passage to collect particulate matter in exhaust gas. The torque converter has a pump impeller that is provided on the input shaft, and a turbine impeller that is provided on the output shaft to transmit a torque between the turbine impeller and the pump impeller via a fluid. The in-vehicle control device performs a fuel cut-off process for carrying out fuel cut-off to stop fuel injection from the fuel injection valve during a prescribed fuel cut-off condition, such as when the lockup clutch is engaged and the accelerator of the vehicle is off (i.e., the accelerator is not pressed). The in-vehicle control device also performs a fuel cut-off suspension process for resuming fuel injection from the fuel injection valve and releasing the lockup clutch when there is a request to suspend the fuel cut-off with the accelerator off. The in-vehicle control device also performs a speed increase process for performing shift control of the automatic transmission such that a rotational speed of the turbine impeller becomes higher while the fuel cut-off suspension process is performed compared to when the fuel cut-off is carried out.

According to the foregoing configuration, if there is a request to suspend fuel cut-off when the vehicle decelerates with the accelerator off, the lockup clutch is released, and shift control of the automatic transmission is performed such that the rotational speed of the turbine impeller increases. When the rotational speed of the turbine impeller increases with the lockup clutch released, the difference between the rotational speed of the pump impeller connected to the crankshaft and the rotational speed of the turbine impeller increases. When the difference between the rotational speed of the pump impeller and the rotational speed of the turbine impeller increases, the efficiency of the torque converter falls, and the amount of friction in the torque converter increases due to the viscosity of the fluid therein. Therefore, the rotational resistance of the turbine impeller increases, and the turbine impeller becomes unlikely to rotate. When the turbine impeller becomes unlikely to rotate, a braking torque is applied to the wheels of the vehicle that are connected to the output shaft side of the automatic transmission. Accordingly, even when the lockup clutch is released, a feeling of deceleration can be produced in the decelerating vehicle.

In the aforementioned in-vehicle control device, the speed increase process may variably set an amount of increase in rotational speed of the turbine impeller such that the amount of increase is made to decrease as a vehicle speed falls. If the braking torque of the wheels is small when the vehicle speed is high, a passenger of the vehicle is unlikely to feel a feeling of deceleration. If the braking torque of the wheels is large when the vehicle speed is low, the passenger of the vehicle is likely to feel an excessive feeling of deceleration. Therefore, in order to make the passenger of the vehicle develop an appropriate feeling of deceleration, it is preferable to reduce the braking torque of the wheels as the vehicle speed falls. It should be noted herein that as the amount of increase in rotational speed of the turbine impeller through the aforementioned speed increase process decreases, the difference between the rotational speed of the turbine impeller and the rotational speed of the pump impeller decreases, and the rotational resistance of the turbine impeller decreases, which causes the braking torque of the wheels to decrease. Thus, the braking torque of the wheels is made to decrease as the vehicle speed falls, by variably setting the amount of increase in rotational speed of the turbine impeller such that this amount of increase decreases as the vehicle speed falls, as is the case with the foregoing configuration. Therefore, the passenger of the vehicle can be made to develop an appropriate feeling of deceleration.

The aforementioned in-vehicle control device may make a request to suspend the fuel cut-off when a temperature of the filter needs to be restrained from rising while the fuel cut-off is carried out. While fuel cut-off is carried out, the PM deposited in the filter burns through the supply of oxygen to the filter, so the temperature of the filter may rise excessively. Thus, in the foregoing configuration, a request to suspend fuel cut-off is made when the temperature of the filter needs to be restrained from rising in such a manner. When the request to suspend fuel cut-off is thus made, the aforementioned fuel cut-off suspension process is performed to resume fuel injection, and hence the combustion of an air-fuel mixture is resumed in the internal combustion engine. When the combustion of the air-fuel mixture is resumed, the amount of oxygen supplied to the filter decreases, so the temperature of the filter is restrained from rising. Then, when the fuel cut-off suspension process for restraining the temperature of the filter from rising is performed, the aforementioned speed increase process is performed. Therefore, a feeling of deceleration can be produced in the vehicle, while restraining the temperature of the filter from rising.

The aforementioned in-vehicle control device may perform a rotational resistance increase process for increasing a rotational resistance of the crankshaft such that the rotational resistance becomes higher while the speed increase process is performed than before performance of the speed increase process is started.

When the rotational speed of the turbine impeller is increased through the aforementioned speed increase process, this increase in rotational speed is also transmitted to the pump impeller via the fluid in the torque converter. Therefore, the rotational speed of the pump impeller may also increase. In this case, the difference between the rotational speed of the turbine impeller and the rotational speed of the pump impeller becomes small, and the braking torque of the wheels decreases. In this respect, according to the foregoing configuration, the rotational resistance increase process for increasing the rotational resistance of the crankshaft is performed while the speed increase process is performed. When the rotational resistance of the crankshaft thus increases, the pump impeller connected to the crankshaft becomes unlikely to rotate. Therefore, even when the rotational speed of the turbine impeller is increased, the rotational speed of the pump impeller is unlikely to increase. Accordingly, the difference between the rotational speed of the turbine impeller and the rotational speed of the pump impeller is kept from becoming small, and hence the braking torque of the wheels can also be kept from decreasing than in the case where the rotational resistance increase process is not performed.

The aforementioned in-vehicle control device may prohibit the rotational resistance increase process from being performed when the vehicle speed is lower than a prescribed threshold. When the vehicle speed is low, the output torque of the internal combustion engine is small. Therefore, if the rotational resistance of the crankshaft is increased at this time, the output torque of the internal combustion engine is likely to become unstable. In this respect, according to the foregoing configuration, when the vehicle speed is lower than the prescribed threshold, the rotational resistance increase process for increasing the rotational resistance of the crankshaft is prohibited from being performed. Therefore, the output torque of the internal combustion engine can be restrained from becoming unstable as described above.

In the case where the internal combustion engine is equipped with an alternator that is rotationally driven by the crankshaft, and an instrument that is operated by electric power generated by the alternator, the rotational resistance increase process may be designed to increase the rotational resistance by increasing an amount of electric power consumed by the instrument.

According to the foregoing configuration, the amount of electric power generated by the aforementioned alternator becomes large, and the rotational resistance of the alternator becomes high due to the increase in the amount of electric power consumed by the aforementioned instrument. Therefore, the rotational resistance of the crankshaft can be increased.

In the case where the instrument is an electrically operated water pump that circulates coolant in the internal combustion engine, the in-vehicle control device may prohibit the rotational resistance increase process from being performed under a situation where a state of combustion in the internal combustion engine becomes unstable.

When the amount of electric power consumed by the electrically operated water pump is increased, the discharge amount of the water pump increases, and the flow rate of coolant increases, so the temperature of the internal combustion engine falls. When this occurs concurrently with a situation where the state of combustion in the internal combustion engine becomes unstable, the output torque of the internal combustion engine may fluctuate greatly. Under this situation the aforementioned rotational resistance increase process in which the discharge amount of the water pump increases is prohibited from being performed. Therefore, the output torque of the internal combustion engine can be restrained from fluctuating remarkably. In the foregoing configuration, it can also be determined that there is a situation under which the state of combustion in the internal combustion engine becomes unstable, for example, when the temperature of air sucked into the internal combustion engine or the temperature of coolant is lower than a prescribed value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a timing chart showing an operation of the second embodiment.

DETAILED DESCRIPTION OF EMBODIMENTS

First Embodiment

Figure 1:
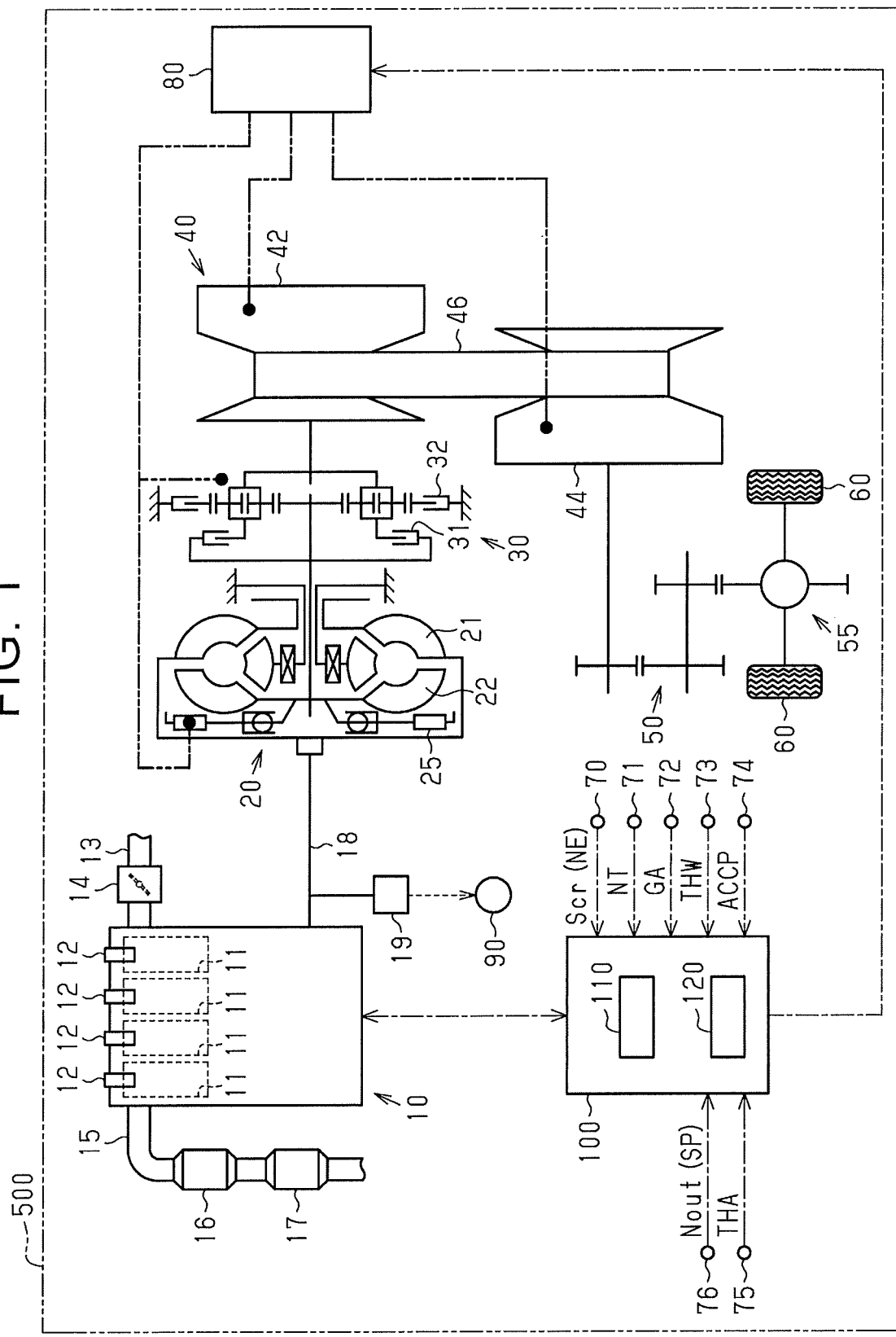
FIG. 1 is a schematic view of a vehicle including an in-vehicle control device according to the first embodiment.

The first embodiment of an in-vehicle control device will be described hereinafter with reference to FIGS. 1 to 6. As shown in FIG. 1, a vehicle 500 includes an internal combustion engine 10 that is equipped with a plurality of cylinders 11. An intake passage 13 is connected to intake ports of the cylinders 11. The intake passage 13 is provided with a throttle valve 14 that adjusts the amount of intake air.

The internal combustion engine 10 is equipped with fuel injection valves 12 that supply fuel to the cylinders 11, respectively. In combustion chambers of the cylinders 11, an air-fuel mixture of air sucked through the intake passage 13 and fuel injected from the fuel injection valves 12 is burned by being ignited through a spark discharge. The exhaust gas produced through combustion of the air-fuel mixture in the combustion chambers is discharged to an exhaust passage 15 connected to exhaust ports of the internal combustion engine 10.

The exhaust passage 15 is provided with a three-way catalyst (hereinafter referred to as a catalyst) 16, which is a catalyst for exhaust gas purification. This catalyst 16 oxidizes and purifies hydrocarbons (HC) and carbon monoxide (CO) contained in exhaust gas, and reduces and purifies nitrogen oxides (NOx) contained in exhaust gas.

The exhaust passage 15 is provided at a position downstream of the catalyst 16 and includes a filter 17 that collects particulate matter (hereinafter referred to as PM) in exhaust gas. A crankshaft 18 of the internal combustion engine 10 is connected to an alternator 19 that is rotationally driven by the crankshaft 18. The internal combustion engine 10 is also equipped with an electrically operated water pump 90, operated by electric power generated by the alternator 19, that circulates coolant in the internal combustion engine 10. The flow rate of the coolant discharged by this water pump 90 increases as a drive duty ratio KD, which is a duty ratio of a voltage supplied thereto, increases.

A driving force generated from the internal combustion engine 10 is transmitted to right and left driving wheels 60 sequentially via a torque converter 20 equipped with a lockup clutch 25, a changeover mechanism 30, a continuously variable transmission 40 as an automatic transmission, a reduction gear 50, a differential gear 55, and the like.

An input shaft of the aforementioned torque converter 20 is provided with a pump impeller 21. The input shaft is connected to the crankshaft 18. An output shaft of the torque converter 20 is provided with a turbine impeller 22. The output shaft is connected to the continuously variable transmission 40 via the changeover mechanism 30. In this torque converter 20, the transmission of torque is carried out between the pump impeller 21 and the turbine impeller 22 via an automatic transmission fluid (ATF), and the transmission of torque is thereby carried out between the input shaft and the output shaft of the torque converter 20.

The lockup clutch (hereinafter referred to as the LUC) 25 is a mechanism whose operating state is changed by a hydraulic pressure of the aforementioned ATF. The operating state of the LUC 25 changes between "an engagement state" where the transmission of torque between the input shaft and the output shaft of the torque converter 20 is carried out via the LUC 25, and "a release state" where the amount of torque transmitted via the LUC 25 is equal to "0" with the engagement state canceled. Incidentally, "the engagement state" of the present embodiment includes "a direct-coupling state" where the input shaft and the output shaft of the torque converter 20 are completely engaged with each other, and "a slip state" where the input shaft and the output shaft of the torque converter 20 rotate relatively to each other to a certain extent through the performance of flex lockup control for controlling the slip amount of the LUC 25.

The changeover mechanism 30 is a double pinion-type planetary gear mechanism, and is equipped with a forward clutch 31 and a reverse brake 32. Also, an output shaft of the changeover mechanism 30 is connected to an input shaft of the continuously variable transmission 40.

Thus, when the reverse brake 32 is released while the forward clutch 31 is engaged, the driving force of the internal combustion engine 10 input via the torque converter 20 is directly transmitted to the continuously variable transmission 40 as a driving force for forward movement. In contrast, when the reverse brake 32 is engaged while the forward clutch 31 is released, the driving force of the internal combustion engine 10 input via the torque converter 20 is transmitted to the continuously variable transmission 40 as a driving force for reverse rotation, namely, a driving force for backward movement.

Incidentally, in this changeover mechanism 30, the transmission of the driving force between the internal combustion engine 10 and the continuously variable transmission 40 is shut off, and a neutral state is established by releasing both the forward clutch 31 and the reverse brake 32.

The continuously variable transmission 40 is equipped with a primary pulley 42 that is provided on the input shaft thereof, a secondary pulley 44 that is provided on an output shaft thereof, and a belt 46 that is wound between the pair of the pulleys. A driving force is transmitted between the primary pulley 42 and the secondary pulley 44 via the belt 46. The speed ratio of the continuously variable transmission 40 is continuously changed by changing the winding radius of the belt 46 around the primary pulley 42 and the secondary pulley 44 through the use of a hydraulic pressure.

A hydraulic circuit 80 filled with ATF is connected to the continuously variable transmission 40, the LUC 25, and the changeover mechanism 30. The shift operation of the continuously variable transmission 40, the operation of the LUC 25, the operation of the changeover mechanism 30, and the like are performed through hydraulic control by this hydraulic circuit 80.

Various kinds of control such as the control of the internal combustion engine 10, the control of the continuously variable transmission 40, the LUC 25, and the changeover mechanism 30 through the hydraulic circuit 80, the drive control of the water pump 90 and the like are performed by an in-vehicle control device (hereinafter referred to as the control device) 100 of the vehicle 500.

The control device 100 is equipped with a central processing unit (hereinafter referred to as a CPU) 110, and a memory 120 in which a program for control and data are stored. Also, the control device 100 performs the various kinds of control through the execution of the program stored in the memory 120 by the CPU 110.

A crank angle sensor 70 that detects a rotational angle of the crankshaft, a rotational speed sensor 71 that detects a turbine rotational speed NT as a rotational speed of the aforementioned turbine impeller 22, and an airflow meter 72 that detects an intake air amount GA of the internal combustion engine 10 are connected to the control device 100, and output signals from the various sensors are input to the control device 100. A coolant temperature sensor 73 that detects a coolant temperature THW as a temperature of coolant in the internal combustion engine 10, and an accelerator position sensor 74 that detects an accelerator operation amount ACCP as an operation amount of an accelerator pedal are connected to the control device 100, and output signals from the various sensors are input to the control device 100. Besides, an intake air temperature sensor 75 that detects an intake air temperature THA as a temperature of air sucked into the internal combustion engine 10, and a secondary pulley rotational speed sensor 76 that detects a rotational speed Nout of the secondary pulley 44 are also connected to the control device 100, and output signals from the various sensors are also input to the control device 100.

The control device 100 also computes an engine rotational speed NE based on an output signal Scr of the crank angle sensor 70. The control device 100 computes an engine load factor KL based on the engine rotational speed NE and the intake air amount GA. The engine load factor KL represents a ratio of a current cylinder inflow air amount to a cylinder inflow air amount at the time of steady operation of the internal combustion engine 10 in a full load state. The cylinder inflow air amount is an amount of air flowing into each of the cylinders 11 in an intake stroke. The control device 100 calculates a vehicle speed SP of the vehicle 500 based on the rotational speed Nout of the secondary pulley 44. The control device 100 calculates a filter temperature Tf as a temperature of the filter 17, based on various engine operating states such as a filling efficiency of intake air, the engine rotational speed NE, and the like.

The control device 100 controls the driving of the water pump 90 by setting the aforementioned drive duty ratio KD such that the coolant temperature THW becomes equal to a prescribed temperature. As one of the various kinds of control, the control device 100 carries out fuel cut-off for stopping fuel injection from the fuel injection valves 12 when a prescribed fuel cut-off condition is fulfilled.

Figure 2:
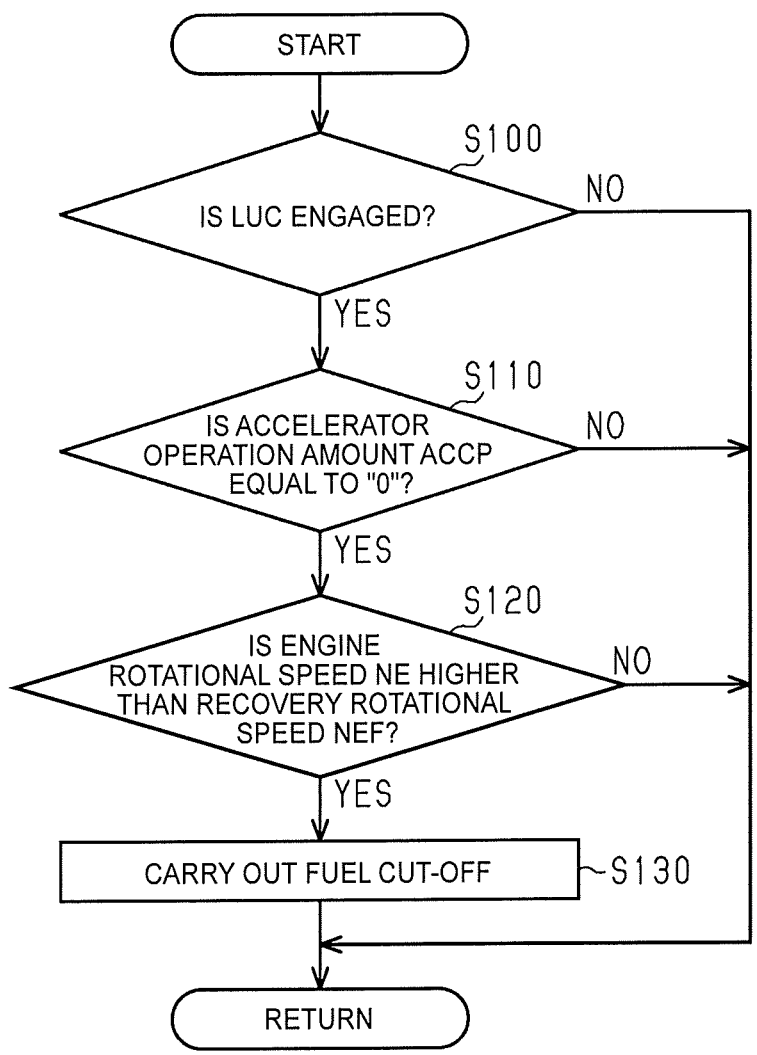
FIG. 2 is a flowchart showing a process that is performed by the in-vehicle control device according to the embodiment.

FIG. 2 shows a process that is performed by the control device 100 to carry out fuel cut-off. The process shown in FIG. 2 is realized through the execution of a program stored in the memory 120 of the control device 100 on a predetermined cycle by the CPU 110. In the descriptions below, each step number will be expressed by a number following the capital letter "S".

When the present process is started, the control device 100 determines whether or not the LUC 25 is engaged (S100). Then, if it is determined that the LUC 25 is engaged (YES in S100), the control device 100 determines whether or not the accelerator operation amount ACCP is equal to "0", namely, whether or not the accelerator is off with the accelerator pedal not depressed (S110). Then, if it is determined that the accelerator operation amount ACCP is equal to "0" and that the accelerator is off (YES in S110), the control device 100 determines whether or not the engine rotational speed NE is higher than a recovery rotational speed NEF (S120). When the engine rotational speed NE becomes equal to or lower than the recovery rotational speed NEF while fuel cut-off is carried out, the control device 100 resumes fuel injection from the fuel injection valves 12. If the engine rotational speed NE is higher than the recovery rotational speed NEF (YES in S120), the control device 100 determines that a fuel cut-off condition is currently fulfilled, and carries out fuel cut-off (S130). Then, the control device 100 temporarily ends the present process. If the result of the determination in S100 is negative, if the result of the determination in S110 is negative, or if the result of the determination in S120 is negative, the control device 100 temporarily ends the present process.

If the above-mentioned fuel cut-off is carried out when the temperature of the filter 17 is high, a large amount of oxygen is supplied to the filter 17. Therefore, the PM deposited in the filter 17 burns, and the amount thereof decreases. The filter 17 is regenerated through this combustion of the PM.

In operation control of the LUC 25 that is performed by the control device 100, one of "the direct-coupling state", "the slip state", and "the release state" is basically selected as an operating state of the LUC 25, based on the accelerator operation amount ACCP and the vehicle speed SP or the like. Then, hydraulic control of the LUC 25 is performed such that the selected operating state is realized. When the accelerator is off while the vehicle 500 runs, the LUC 25 is rendered in "the direct-coupling state" or "the slip state". When the processing of S230 shown in FIG. 3, which will be described later, is performed, the LUC 25 is rendered in "the release state".

Figure 3:
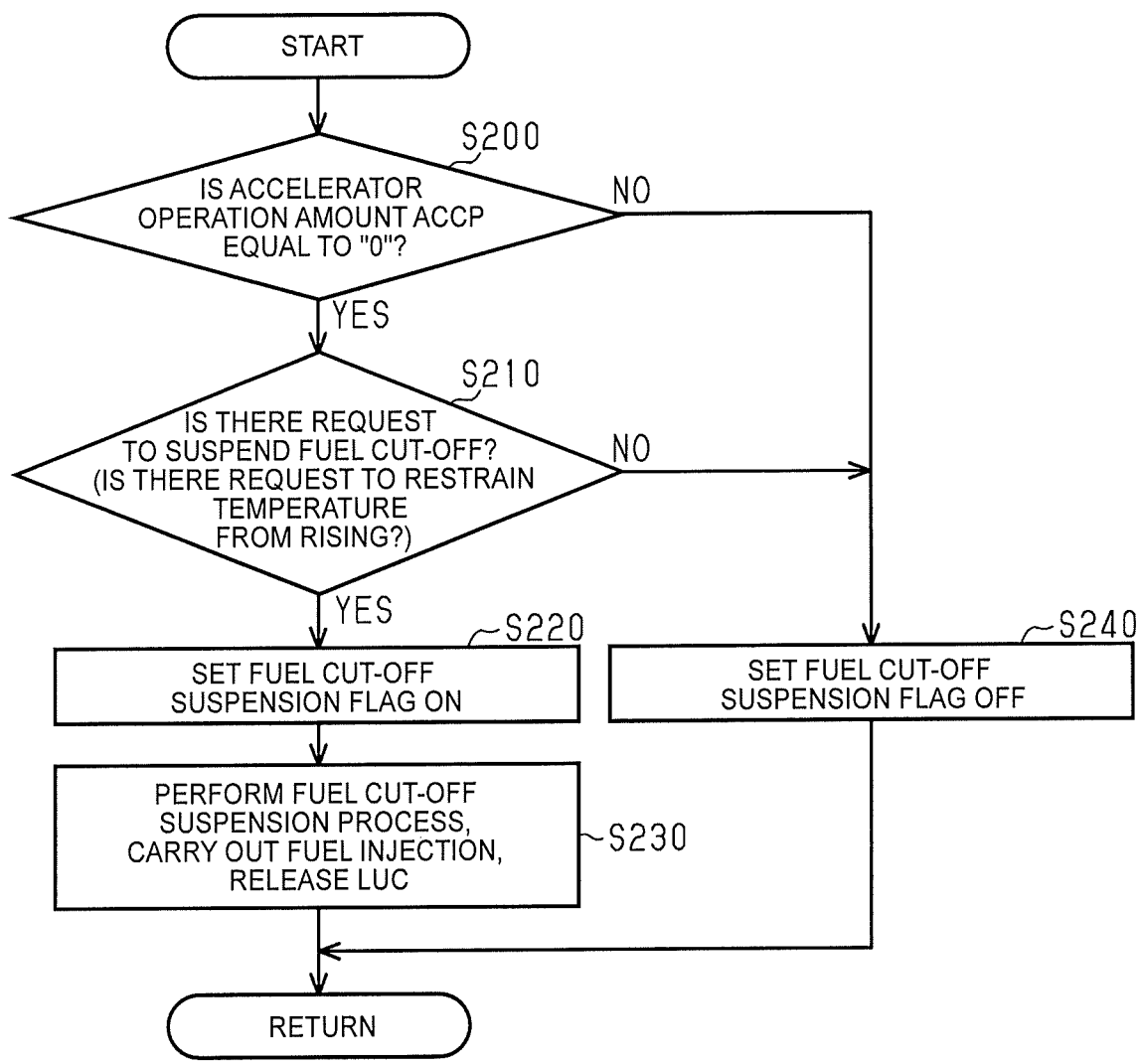
FIG. 3 is a flowchart showing the process that is performed by the in-vehicle control device according to the embodiment.

FIG. 3 shows a process that is performed by the control device 100. The process shown in this FIG. 3 is realized through the execution of a program stored in the memory 120 of the control device 100 on a predetermined cycle by the CPU 110. When fuel cut-off is started in the processing of S130 shown in the aforementioned FIG. 2, the control device 100 starts a series of processing steps shown in FIG. 3.

When the present process is started, the control device 100 determines whether or not the accelerator operation amount ACCP is equal to "0", namely, whether or not the accelerator is off with the accelerator pedal not depressed (S200). Then, if it is determined that the accelerator operation amount ACCP is equal to "0" and hence the actuator is off (YES in S200), the control device 100 determines whether or not there is a request to suspend fuel cut-off started in the processing of the aforementioned S130 (S210). If the following condition is fulfilled in this S210, the control device 100 determines that there is a request to suspend fuel cut-off.

Specifically, while fuel cut-off is carried out, the PM deposited in the filter 17 burns through the supply of oxygen to the filter 17. Therefore, if fuel cut-off is continued for a predetermined time or more, the temperature of the filter 17 may rise excessively. When the temperature of the filter 17 needs to be restrained from rising excessively, the control device 100 determines that there is a request to suspend fuel cut-off. In more concrete terms, the control device 100 determines whether or not an elapsed time KT from the timing corresponding to the start of fuel cut-off in the processing of S130 to the present timing is equal to or longer than a prescribed time Ta determined in advance. Then, if the elapsed time KT is equal to or longer than the prescribed time Ta, the control device 100 determines that there is a request to suspend fuel cut-off, because the temperature of the filter 17 may rise excessively if fuel cut-off continues to be carried out. On the other hand, if the elapsed time KT is shorter than the prescribed time Ta, the control device 100 determines that there is no request to suspend fuel cut-off.

In the processing of S210, if the filter temperature Tf is equal to or higher than the prescribed temperature while fuel cut-off is carried out, it may be determined that there is a request to suspend fuel cut-off in order to keep the temperature of the filter 17 from rising.

In the processing of S210, if it is determined that there is a request to suspend fuel cut-off (YES in S210), the control device 100 determines that there is currently a request to suspend fuel cut-off with the accelerator off, and that a condition for setting a fuel cut-off suspension flag FCSF "ON" is fulfilled. As a result, the control device 100 sets the fuel cut-off suspension flag FCSF "ON" (S220). The initial value of the fuel cut-off suspension flag FCSF is "OFF".

When the fuel cut-off suspension flag FCSF is thus set "ON", the control device 100 determines that the condition for performing the fuel cut-off suspension process is fulfilled, and performs the fuel cut-off suspension process (S230). Then, the control device 100 temporarily ends the present process.

When the fuel cut-off suspension process is performed in S230, fuel injection from the respective fuel injection valves 12 is carried out. Thus, the fuel cut-off started in the processing of the aforementioned S130 is suspended, and the combustion of the air-fuel mixture is resumed in the internal combustion engine 10. The fuel injection amount in carrying out fuel injection in this fuel cut-off suspension process is set as a fuel injection amount that makes it possible to hold the internal combustion engine 10 in an idle operation state. When the fuel cut-off suspension process is performed, the LUC 25 is rendered in the release state.

If the result of the determination in the processing of the aforementioned S200 or the result of the determination in the processing of the aforementioned S210 is negative, the control device 100 sets the fuel cut-off suspension flag FCSF "OFF" (S240), and temporarily ends the present process without performing the aforementioned fuel cut-off suspension process.

Figure 4:
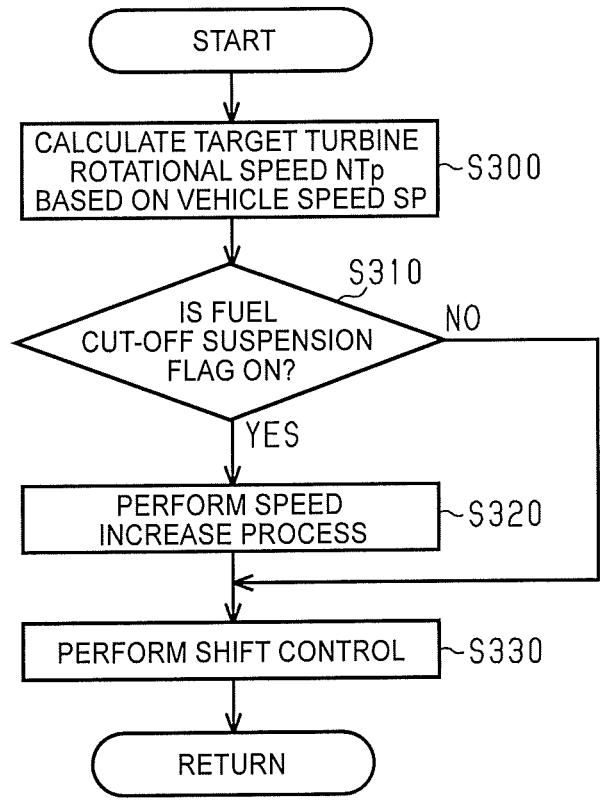
FIG. 4 is a flowchart showing the process that is performed by the in-vehicle control device according to the embodiment.

FIG. 4 a process of shift control of the continuously variable transmission 40 performed by the control device 100 when the accelerator is off. The process shown in FIG. 4 is realized through the execution of the program stored in the memory 120 of the control device 100 on a predetermined cycle by the CPU 110 and with the accelerator off.

When the present process is started, the control device 100 calculates a target turbine rotational speed NTp, namely, a target value of the turbine rotational speed NT of the turbine impeller 22 that rotates synchronously with the primary pulley 42, based on the vehicle speed SP or the like (S300). It should be noted herein that the accelerator operation amount ACCP is equal to "0" and that the vehicle 500 decelerates when the accelerator is off. Therefore, when the accelerator is off, the control device 100 variably sets the target turbine rotational speed NTp such that the feeling of deceleration of the vehicle 500 becomes an appropriate feeling corresponding to the vehicle speed SP. When the operational state of auxiliaries of the internal combustion engine 10 changes, the state of rotation of the crankshaft 18 changes, and the feeling of deceleration of the vehicle 500 changes. Therefore, the operational state of the auxiliaries of the internal combustion engine 10 may be taken into account in variably setting the target turbine rotational speed NTp when the accelerator is off.

Subsequently, the control device 100 determines whether or not the aforementioned fuel cut-off suspension flag FCSF is "ON", namely, whether or not the fuel cut-off suspension process is currently performed (S310). Then, if the fuel cut-off suspension flag FCSF is "OFF" (NO in S310), the control device 100 performs shift control for controlling the speed ratio of the continuously variable transmission 40 such that the actual turbine rotational speed NT converges to the target turbine rotational speed NTp set in S300 (S330). Then, the control device 100 temporarily ends the present process.

On the other hand, if the fuel cut-off suspension flag FCSF is "ON" (YES in S310), the control device 100 performs a speed increase process for increasing the rotational speed of the turbine impeller 22 to a rotational speed higher than when fuel cut-off is carried out (S320).

Figure 5:
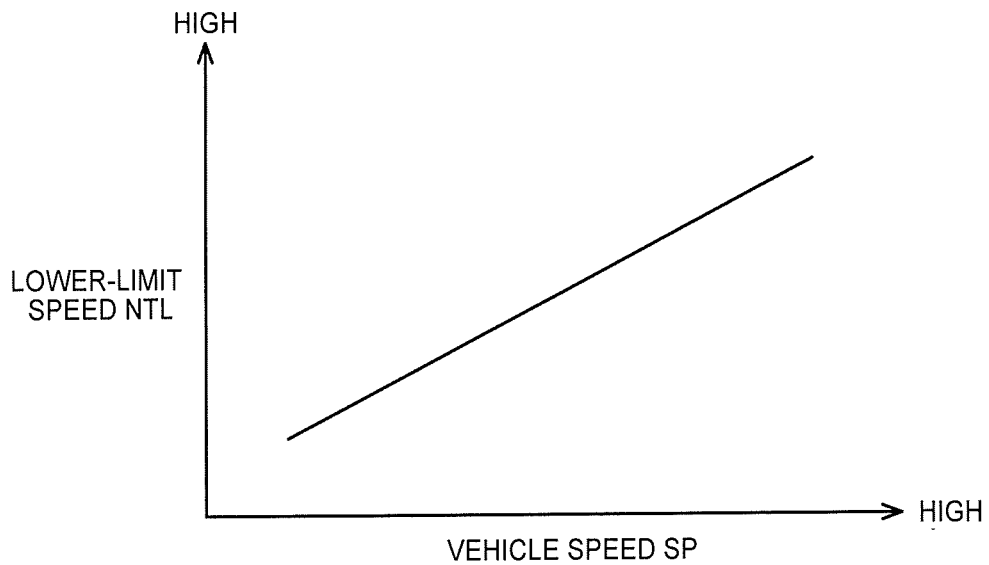
FIG. 5 is a graph showing a tendency to set a lower-limit speed based on a vehicle speed in the embodiment.

As shown in FIG. 5, in this speed increase process, a lower-limit speed NTL for raising the aforementioned target turbine rotational speed NTp, such that the turbine rotational speed NT becomes equal to or higher than a prescribed speed, when the accelerator is off is variably set based on the vehicle speed SP. In more concrete terms, the lower-limit speed NTL is variably set such that the lower-limit speed NTL falls as the vehicle speed SP falls. When the vehicle speed SP remains unchanged, the lower-limit speed NTL is higher than the target turbine rotational speed NTp, which is set when the accelerator is off. The amount of increase in the turbine rotational speed NT is variably set such that this amount of increase decreases as the vehicle speed SP falls, by variably setting the lower-limit speed NTL based on this vehicle speed SP.

Then, when the lower-limit speed NTL is set, the target turbine rotational speed NTp set in S300 is limited to the lower-limit speed NTL, in the aforementioned speed increase process. Thus, the target turbine rotational speed NTp is increased to the lower-limit speed NTL. Then, the control device 100 performs shift control of S330 such that the actual turbine rotational speed NT converges to the target turbine rotational speed NTp thus increased, and temporarily ends the present process.

Next, the operation of the present embodiment will be described with reference to FIG. 6. A solid line L1 shown in FIG. 6 indicates the engine rotational speed NE, and an alternate long and short dash line L2 indicates the turbine rotational speed NT. An alternate long and two short dashes line L3 indicates the turbine rotational speed NT in the case where fuel cut-off is continued through timing t2. It is also assumed that the solid line L1 and the alternate long and short dash line L2 coincide with each other between a timing t1 and the timing t2.

Figure 6:
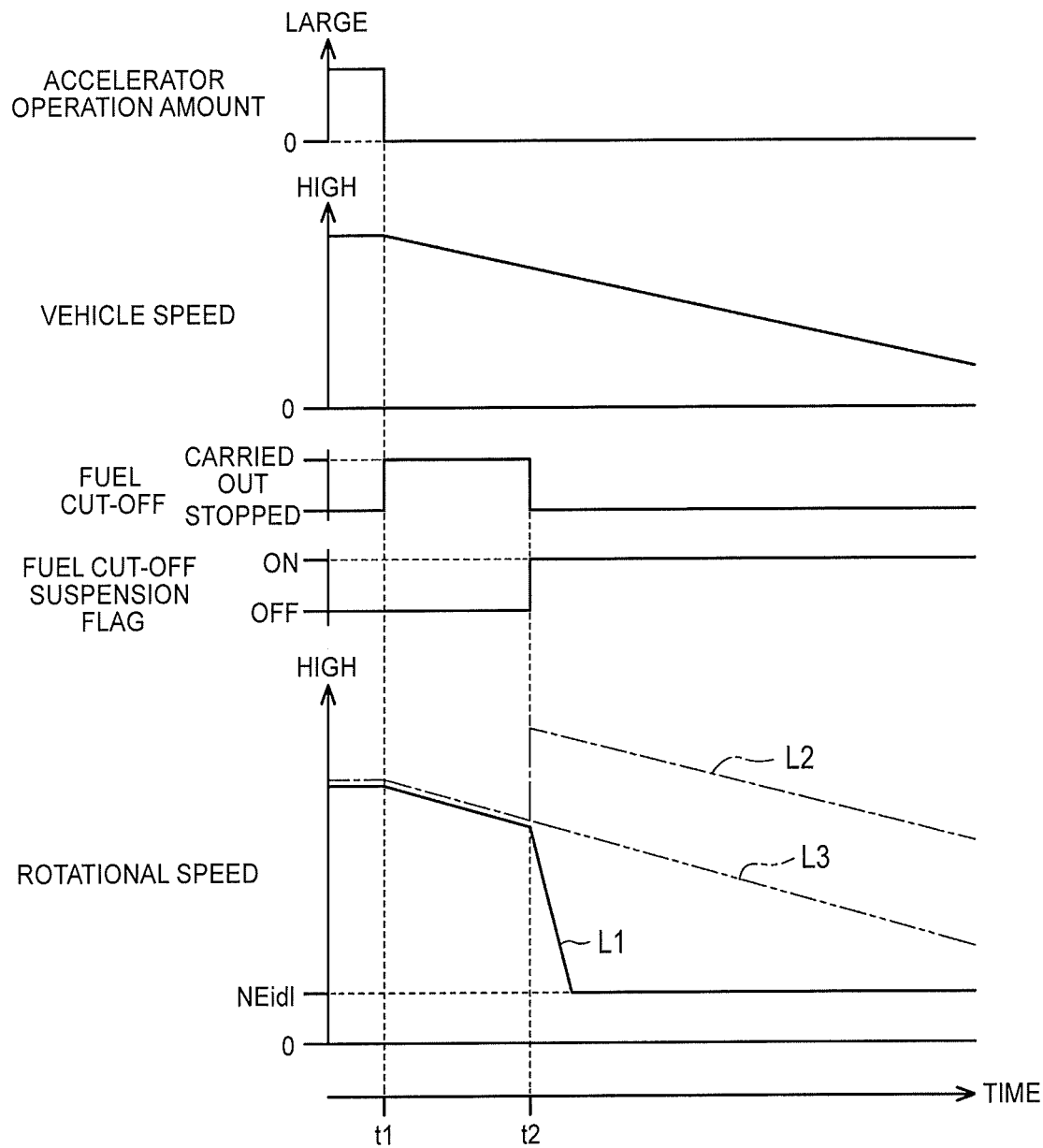
FIG. 6 is a timing chart showing an operation of the embodiment.

As shown in FIG. 6, when the accelerator operation amount ACCP becomes equal to "0" and the accelerator is off (at the timing t1), with the LUC 25 engaged while the vehicle runs, fuel cut-off is carried out. It should be noted herein that since the LUC 25 is engaged, a braking torque resulting from friction of the internal combustion engine 10, namely, so-called engine braking is applied to the driving wheels of the vehicle 500, and that the vehicle speed SP gradually falls through the timing t1. Since the LUC 25 is engaged, the engine rotational speed NE gradually falls as the vehicle speed SP falls, and the turbine rotational speed NT also gradually falls as the vehicle speed SP falls.

Then, when it is determined that there is a request to suspend fuel cut-off, while the accelerator off at the timing t2, the fuel cut-off suspension flag FCSF is changed from "OFF" to "ON", and the aforementioned fuel cut-off suspension process is started through the setting "ON" of this fuel cut-off suspension flag FCSF.

When the fuel cut-off suspension process is started at the timing t2, fuel injection is carried out to thereby stop fuel cut-off, and the combustion of the air-fuel mixture is resumed. The LUC 25 is also released, so the engine rotational speed NE rapidly falls toward an idling rotational speed NEidl. Then, at the timing t2, the fuel cut-off suspension process is performed while the fuel cut-off suspension flag FCSF is "ON", and the fuel cut-off suspension process is continued after the timing t2.

While the fuel cut-off suspension process is performed, the above-mentioned speed increase process is performed to set the aforementioned lower-limit speed NTL, and the lowest speed of the target turbine rotational speed NTp is thereby limited. Therefore, as indicated by the alternate long and short dash line L2, the actual turbine rotational speed NT is higher than the turbine rotational speed NT in the case where fuel cut-off is continuously carried out at and after the timing t2 as well as indicated by the alternate long and two short dashes line L3. The turbine rotational speed NT thus gradually falls as the lower-limit speed NTL falls as a result of a fall in the vehicle speed SP. Then, the difference between the rotational speed of the pump impeller 21, which is equal to the engine rotational speed NE, and the rotational speed of the turbine impeller 22 gradually decreases as the turbine rotational speed NT falls as a result of a fall in vehicle speed.

Next, the effects of the present embodiment will be described. If there is a request to suspend fuel cut-off when the vehicle 500 decelerates with the accelerator off, namely, with the accelerator pedal not depressed (YES in S210 of FIG. 3), the aforementioned fuel cut-off process is performed to release the LUC 25. If there is a request to suspend fuel cut-off (YES in S210 of FIG. 3), the fuel cut-off suspension flag FCSF is set "ON" (S220 of FIG. 3). Thus, if the result of the determination in the processing of S310 of FIG. 4 is positive, the speed increase process for increasing the rotational speed of the turbine impeller 22 is performed (S320 of FIG. 4).

When the rotational speed of the turbine impeller 22 increases with the LUC 25 thus released, the difference between the rotational speed of the pump impeller 21 connected to the crankshaft 18 and the rotational speed of the turbine impeller 22 increases. When the difference between the rotational speed of the pump impeller 21 and the rotational speed of the turbine impeller 22 increases, the efficiency of the torque converter 20 falls, and the amount of friction resulting from the viscosity of fluid increases in the torque converter 20. Therefore, the rotational resistance of the turbine impeller 22 increases, and the turbine impeller 22 becomes unlikely to rotate. When the turbine impeller 22 becomes unlikely to rotate, a braking torque is applied to the driving wheels 60 of the vehicle that are connected to the output shaft side of the continuously variable transmission 40. Accordingly, even when the LUC 25 is released, a feeling of deceleration can be produced in the vehicle 500 that decelerates with the accelerator off.

If the braking torque of the driving wheels 60 is small when the vehicle speed is high, a passenger of the vehicle is unlikely to feel a feeling of deceleration. Besides, if the braking torque of the driving wheels 60 is large when the vehicle speed is low, the passenger of the vehicle is likely to feel an excessive feeling of deceleration. Therefore, in order to make the passenger of the vehicle develop an appropriate feeling of deceleration, it is preferable to reduce the braking torque of the driving wheels 60 as the vehicle speed falls. It should be noted herein that as the amount of increase in rotational speed of the turbine impeller 22 through the aforementioned speed increase process decreases, the difference between the rotational speed of the turbine impeller 22 and the rotational speed of the pump impeller 21 decreases, the rotational resistance of the turbine impeller 22 decreases, and hence the braking torque of the driving wheels 60 decreases.

Thus, in the present embodiment, the aforementioned lower-limit speed NTL for raising the target turbine rotational speed NTp when the accelerator is off is lowered as the vehicle speed SP falls. Then, in this manner, the rotational speed of the turbine impeller 22 falls, and the amount of increase in rotational speed of the turbine impeller 22 through the aforementioned speed increase process decreases, as the vehicle speed SP falls. Accordingly, when the vehicle speed SP falls, the amount of increase in rotational speed of the turbine impeller 22 decreases in accordance with the fall in the vehicle speed SP, and the braking torque of the driving wheels 60 decreases. Therefore, the passenger of the vehicle can be made to develop an appropriate feeling of deceleration.

In the processing of S210 shown in FIG. 3, when the temperature of the filter 17 needs to be kept from rising, a request to suspend fuel cut-off is made. When the request to suspend fuel cut-off is thus made, the fuel cut-off suspension flag FCSF is set "ON" to perform the aforementioned fuel cut-off suspension process, and fuel injection is carried out. When fuel injection is thus carried out, the combustion of the air-fuel mixture is resumed in the internal combustion engine 10, the amount of oxygen supplied to the filter 17 decreases, and hence the temperature of the filter 17 is kept from rising. Then, when the aforementioned fuel cut-off suspension process for keeping the temperature of the filter 17 from thus rising is performed, the aforementioned speed increase process is performed. Therefore, a feeling of deceleration can be produced in the vehicle 500 while keeping the temperature of the filter 17 from rising.

Second Embodiment

Next, the second embodiment of the in-vehicle control device will be described with reference to FIGS. 7 and 8. In the present embodiment, while the above-mentioned speed increase process is performed, a rotational resistance increase process for increasing the rotational resistance of the crankshaft 18 such that this rotational resistance becomes higher than before starting the performance of the speed increase process is further performed.

The rotational resistance increase process will be described hereinafter with reference to FIG. 7. FIG. 7 shows a procedure of a process that is performed by the control device 100. Incidentally, the process shown in FIG. 7 is realized through the execution of a program stored in the memory 120 of the control device 100 on a predetermined cycle by the CPU 110.

When the present process is started, the control device 100 determines whether or not the aforementioned fuel cut-off suspension flag FCSF is "ON", namely, whether the fuel cut-off suspension process is currently performed (S400). Then, if it is determined that the fuel cut-off suspension flag FCSF is "ON" (YES in S400), the control device 100 determines whether or not the current vehicle speed SP is equal to or higher than a prescribed threshold α (S410). The following describes the setting of the threshold α.

If the rotational resistance of the crankshaft 18 is increased when the vehicle speed is low and the output torque of the internal combustion engine 10 is small, the output torque of the internal combustion engine 10 is likely to become unstable. Thus, the magnitude of the aforementioned threshold α is set such that it can be appropriately determined that the current output torque of the internal combustion engine 10 is large without becoming unstable even when the rotational resistance of the crankshaft 18 is increased, based on a state where the vehicle speed SP is equal to or higher than the threshold α.

Then, if it is determined that the vehicle speed SP is equal to or higher than the threshold α (YES in S410), the control device 100 determines whether or not there is currently a situation under which the state of combustion in the internal combustion engine 10 becomes unstable (S420). In this S420, the control device 100 determines that there is a situation under which the state of combustion in the internal combustion engine becomes unstable, for example, when the intake air temperature THA is lower than a prescribed value or when the coolant temperature THW is lower than a prescribed value.

If it is determined that there is no situation under which the state of combustion in the internal combustion engine 10 becomes unstable (NO in S420), the control device 100 performs the rotational resistance increase process (S430). As this rotational resistance increase process, the control device 100 performs an increase process for increasing the aforementioned drive duty ratio KD of the water pump 90 such that the drive duty ratio KD becomes larger than before starting the performance of the aforementioned speed increase process. In the present embodiment, the drive duty ratio KD during the performance of the rotational resistance increase process is made larger than the drive duty ratio KD that is set such that the coolant temperature THW becomes equal to a prescribed temperature, by raising a lower-limit value of the drive duty ratio KD. Alternatively, the drive duty ratio KD may be increased by correcting, in an increasing manner, the drive duty ratio KD that is set such that the coolant temperature THW becomes equal to a prescribed temperature.

When the rotational resistance increase process is thus performed, the control device 100 temporarily ends the present process. On the other hand, if the result of the determination in the aforementioned S400 is negative, if the result of the determination in the aforementioned S410 is negative, or if the result of the determination in the aforementioned S420 is positive, the control device 100 prohibits the rotational resistance increase process from being performed (S440), and temporarily ends the present process.

Next, the operation of the present embodiment will be described with reference to FIG. 8. The changes in accelerator operation amount, the changes in vehicle speed, the state where fuel cut-off is carried out, the state of the fuel cut-off suspension flag, and the changes in engine rotational speed and turbine rotational speed shown in FIG. 8 are the same as the changes and states shown in the aforementioned FIG. 6, respectively. In the example shown in FIG. 8, it is also determined that there is no situation under which the state of combustion in the internal combustion engine 10 becomes unstable.

As shown in FIG. 8, when the fuel cut-off suspension flag FCSF is set "ON" and the speed increase process is started at the timing t2, the above-mentioned rotational resistance increase process is started. Thus, the drive duty ratio KD of the water pump 90 is increased to become larger than before starting the performance of the speed increase process at the timing t2. Then, when the vehicle speed SP that has fallen with the accelerator off becomes lower than the aforementioned threshold α (at a timing t3), the result of the determination in the processing of the aforementioned S410 becomes negative, and hence the rotational resistance increase process is prohibited from being performed. Due to the prohibition of the performance of this rotational resistance increase process, the increased drive duty ratio KD returns to the drive duty ratio KD that is set such that the coolant temperature THW becomes equal to the prescribed temperature.

As described hitherto, the drive duty ratio KD of the water pump 90 is increased due to the performance of the rotational resistance increase process between the timing t2 and the timing t3. When this drive duty ratio KD increases, the amount of electric power consumed by the water pump 90 increases. Thus, the amount of electric power generated by the alternator 19 becomes large, and the rotational resistance of the alternator 19 becomes high. Therefore, the rotational resistance of the crankshaft 18 increases to become higher than before starting the performance of the speed increase process at the timing t2.

Next, the effects of the present embodiment will be described. When the rotational speed of the turbine impeller 22 is increased through the aforementioned speed increase process, the increase in rotational speed is also transmitted to the pump impeller 21 via the fluid in the torque converter 20. Therefore, the rotational speed of the pump impeller 21 may also increase. In this case, the difference between the rotational speed of the turbine impeller 22 and the rotational speed of the pump impeller 21 becomes small, and the braking torque of the driving wheels 60 decreases.

In this respect, according to the present embodiment, the rotational resistance increase process for increasing the rotational resistance of the crankshaft 18 is performed while the speed increase process is performed. When the rotational resistance of the crankshaft 18 thus increases, the pump impeller 21 connected to the crankshaft 18 becomes unlikely to rotate. Therefore, even when the rotational speed of the turbine impeller 22 is increased, the rotational speed of the pump impeller 21 is unlikely to increase. Accordingly, the difference between the rotational speed of the turbine impeller 22 and the rotational speed of the pump impeller 21 is more restrained from becoming small, and hence the braking torque of the driving wheels 60 can be more restrained from decreasing, than in the case where the rotational resistance increase process is not performed.

The output torque of the internal combustion engine 10 is small when the vehicle speed is low. Therefore, when the rotational resistance of the crankshaft 18 is increased on such an occasion, the output torque of the internal combustion engine 10 is likely to become unstable. In this respect, according to the present embodiment, when the vehicle speed SP is lower than the threshold α (NO in S410 of FIG. 7), the rotational resistance increase process for increasing the rotational resistance of the crankshaft 18 is prohibited from being performed (S440 of FIG. 7). Therefore, the output torque of the above-mentioned internal combustion engine 10 can be restrained from becoming unstable.

As the rotational resistance increase process, the amount of electric power consumed by the water pump 90 that is operated by the electric power generated by the alternator 19 is increased. Thus, the rotational resistance of the crankshaft 18 can be increased.

When the amount of electric power consumed by the water pump 90 is increased, the discharge amount of the water pump 90 increases, and the flow rate of coolant increases, so the temperature of the internal combustion engine 10 falls. When this fall in temperature of the internal combustion engine 10 occurs concurrently with the situation where the state of combustion in the internal combustion engine 10 becomes unstable, the output torque of the internal combustion engine 10 may fluctuate greatly.

Figure 7:
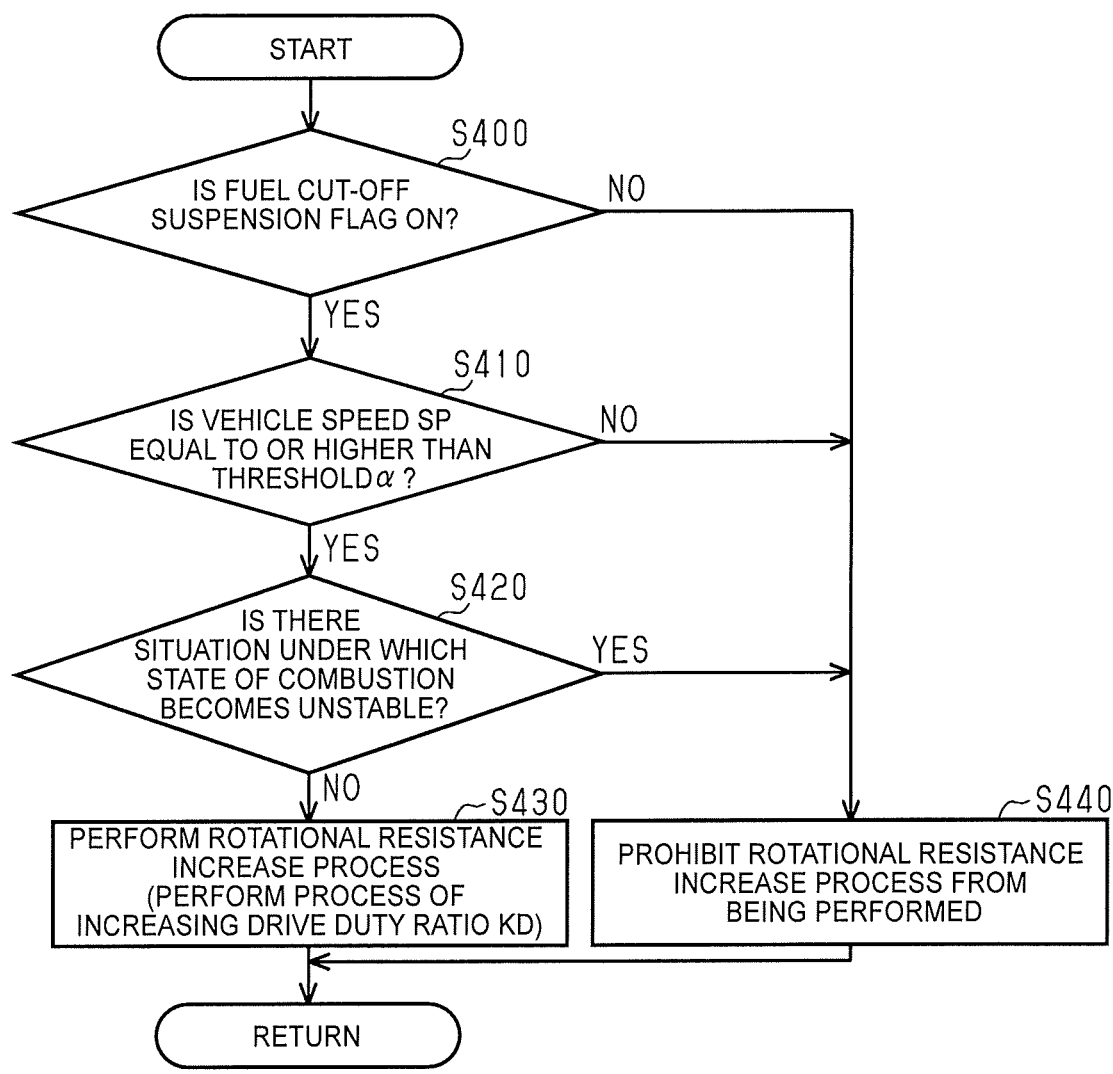
FIG. 7 is a flowchart showing a process that is performed by an in-vehicle control device according to the second embodiment.

In this respect, according to the present embodiment, under this situation where the state of combustion in the internal combustion engine 10 becomes unstable (NO in S420 of FIG. 7), the aforementioned rotational resistance increase process that leads to an increase in discharge amount of the water pump 90 is prohibited from being performed (S440 of FIG. 7). Therefore, the output torque of the internal combustion engine 10 can be kept from fluctuating greatly.

Each of the aforementioned embodiments can be carried out with the following modifications without departing from the scope of the present disclosure. The respective embodiments and the following modification examples can be carried out after being combined with one another within such a range that no technical contradiction is caused.

In the aforementioned speed increase process, the lower-limit speed NTL is variably set. However, the lower-limit speed NTL may be a fixed value. In the aforementioned speed increase process, the lower-limit speed NTL is variably set to increase the rotational speed of the turbine impeller 22. However, the rotational speed of the turbine impeller 22 may be increased in other modes. For example, the rotational speed of the turbine impeller 22 may be increased by correcting, in an increasing manner, the target turbine rotational speed NTp that is set in S300 of FIG. 4.

When the temperature of the filter 17 needs to be kept from rising while fuel cut-off is carried out, a request to suspend fuel cut-off is made. However, the request to suspend fuel cut-off with the accelerator off may be made for other reasons.

The processing of S410 of FIG. 7 described in the second embodiment may be omitted, or the processing of S420 of FIG. 7 may be omitted. In the rotational resistance increase process of the second embodiment, the rotational resistance of the crankshaft 18 is increased by increasing the amount of electric power consumed by the water pump 90. Alternatively, the rotational resistance of the crankshaft 18 may be increased by increasing the amount of electric power consumed by an additional instrument that is operated by the electric power generated by the alternator 19. As such an additional instrument, it is possible to mention, for example, an electrically operated fan that is provided in a radiator, an electrically operated compressor for air-conditioning, an electric heater, or the like.

In the rotational resistance increase process of the second embodiment, the rotational resistance of the crankshaft 18 is increased by increasing the electric load of the auxiliary (the water pump 90) provided in the internal combustion engine. However, the rotational resistance of the crankshaft 18 may be increased through the use of another load that is different from the electric load. For example, in the case where a mechanical variable-capacity compressor for air-conditioning that is rotationally driven by the crankshaft is provided, the rotational resistance of the crankshaft 18 may be increased by increasing the load of the compressor for air-conditioning.

The automatic transmission with which the vehicle 500 is equipped is the continuously variable transmission 40. However, the automatic transmission with which the vehicle 500 is equipped may be another automatic transmission, for example, a stepped multi-stage transmission.

What is claimed is:

1. An in-vehicle control device that is included in a vehicle that is equipped with an internal combustion engine, an automatic transmission, and a torque converter having an input shaft that is connected to a crankshaft of the internal combustion engine, an output shaft that is connected to the automatic transmission, and a lockup clutch that is provided between the input shaft and the output shaft, wherein
the internal combustion engine has a fuel injection valve that supplies fuel to a cylinder, and a filter that is provided in an exhaust passage to collect particulate matter in exhaust gas, and
the torque converter has a pump impeller that is provided on the input shaft, and a turbine impeller that is provided on the output shaft to transmit a torque between the turbine impeller and the pump impeller via a fluid, the in-vehicle control device comprising:
a processor configured to
perform a fuel cut-off process for carrying out fuel cut-off to stop fuel injection from the fuel injection valve when a prescribed fuel cut-off condition occurs, the prescribed fuel cut-off condition including engagement of the lockup clutch is engaged and an accelerator that is off, the filter in the exhaust passage being heated to remove particulate matter during the fuel cut-off process,
perform a fuel cut-off suspension process for carrying out fuel injection from the fuel injection valve and releasing the lockup clutch when there is a request to suspend the fuel cut-off with the accelerator off, and
perform a speed increase process for performing shift control of the automatic transmission such that a rotational speed of the turbine impeller becomes higher while the fuel cut-off suspension process is performed than when the fuel cut-off is carried out.

2. The in-vehicle control device according to claim 1, wherein
in the speed increase process, the processor is configured to variably set an amount of increase in rotational speed of the turbine impeller such that the amount of increase decreases as a vehicle speed falls.

3. The in-vehicle control device according to claim 1, wherein the request to suspend the fuel cut-off is made when a temperature of the filter needs to be kept from rising while the fuel cut-off is carried out.

4. The in-vehicle control device according to claim 1, wherein the processor performs a rotational resistance increase process for increasing a rotational resistance of the crankshaft such that the rotational resistance becomes higher while the speed increase process is performed than before performance of the speed increase process is started.

5. The in-vehicle control device according to claim 4, wherein the processor prohibits the rotational resistance increase process from being performed when the vehicle speed is lower than a prescribed threshold.

6. The in-vehicle control device according to claim 4, wherein
the internal combustion engine is equipped with an alternator that is rotationally driven by the crankshaft, and an instrument that is operated by electric power generated by the alternator, and the processor increases the rotational resistance through the rotational resistance increase process by increasing an amount of electric power consumed by the instrument.

7. The in-vehicle control device according to claim 6, wherein
the instrument is an electrically operated water pump that circulates coolant in the internal combustion engine,
the processor of the in-vehicle control device prohibiting the rotational resistance increase process from being performed under a situation where a state of combustion in the internal combustion engine becomes unstable.

8. The in-vehicle control device according to claim 3, wherein the request to suspend the fuel cut-off process is made after a predetermined amount of time from a start of the fuel cut-off process.

* * * * *